(No Model.) 3 Sheets—Sheet 1.

J. B. MOCKRIDGE.
POULTRY CAR.

No. 533,721. Patented Feb. 5, 1895.

WITNESSES:
J. A. Criswell.
E. Sedgwick.

INVENTOR
J. B. Mockridge
BY Munn & Co.
ATTORNEYS.

(No Model.) 3 Sheets—Sheet 2.

J. B. MOCKRIDGE.
POULTRY CAR.

No. 533,721. Patented Feb. 5, 1895.

WITNESSES:

INVENTOR
J. B. Mockridge
BY Munn & Co.
ATTORNEYS.

(No Model.) 3 Sheets—Sheet 3.

J. B. MOCKRIDGE.
POULTRY CAR.

No. 533,721. Patented Feb. 5, 1895.

WITNESSES:
J. A. E. Criswell
C. Sedgwick

INVENTOR
J. B. Mockridge
BY Munn & Co.
ATTORNEYS.

UNITED STATES PATENT OFFICE.

JOSEPH BABBITT MOCKRIDGE, OF NEW YORK, N. Y.

POULTRY-CAR.

SPECIFICATION forming part of Letters Patent No. 533,721, dated February 5, 1895.

Application filed March 2, 1892. Serial No. 423,456. (No model.)

*To all whom it may concern:*

Be it known that I, JOSEPH BABBITT MOCKRIDGE, of the city, county, and State of New York, have invented a new and Improved Poultry-Car, of which the following is a full, clear, and exact description.

The object of the invention is to provide a new and improved poultry car, which is simple and durable in construction, completely ventilated, arranged to ship live poultry to great distances without injury to the birds, constructed to permit of conveniently feeding and watering the poultry while in transit, and arranged to permit of an immediate discharge of all droppings to avoid offensive odors in the car and to prevent spreading of disease among the live stock. The invention consists principally of an open frame-work forming a permanent fixture of the car and provided with compartments, one for each bird. The invention further consists of an open frame-work arranged in an inclined position in the car and formed with single compartments arranged in vertical rows, the compartments of one vertical row being arranged one above and in the rear of the other, so that the droppings of the birds are discharged through an opening in the floor of the car.

The invention also consists of certain parts and details and combinations of the same, as will be hereinafter described, and then pointed out in the claims.

Reference is to be had to the accompanying drawings forming a part of this specification, in which similar letters of reference indicate corresponding parts in all the figures.

Figure 1:
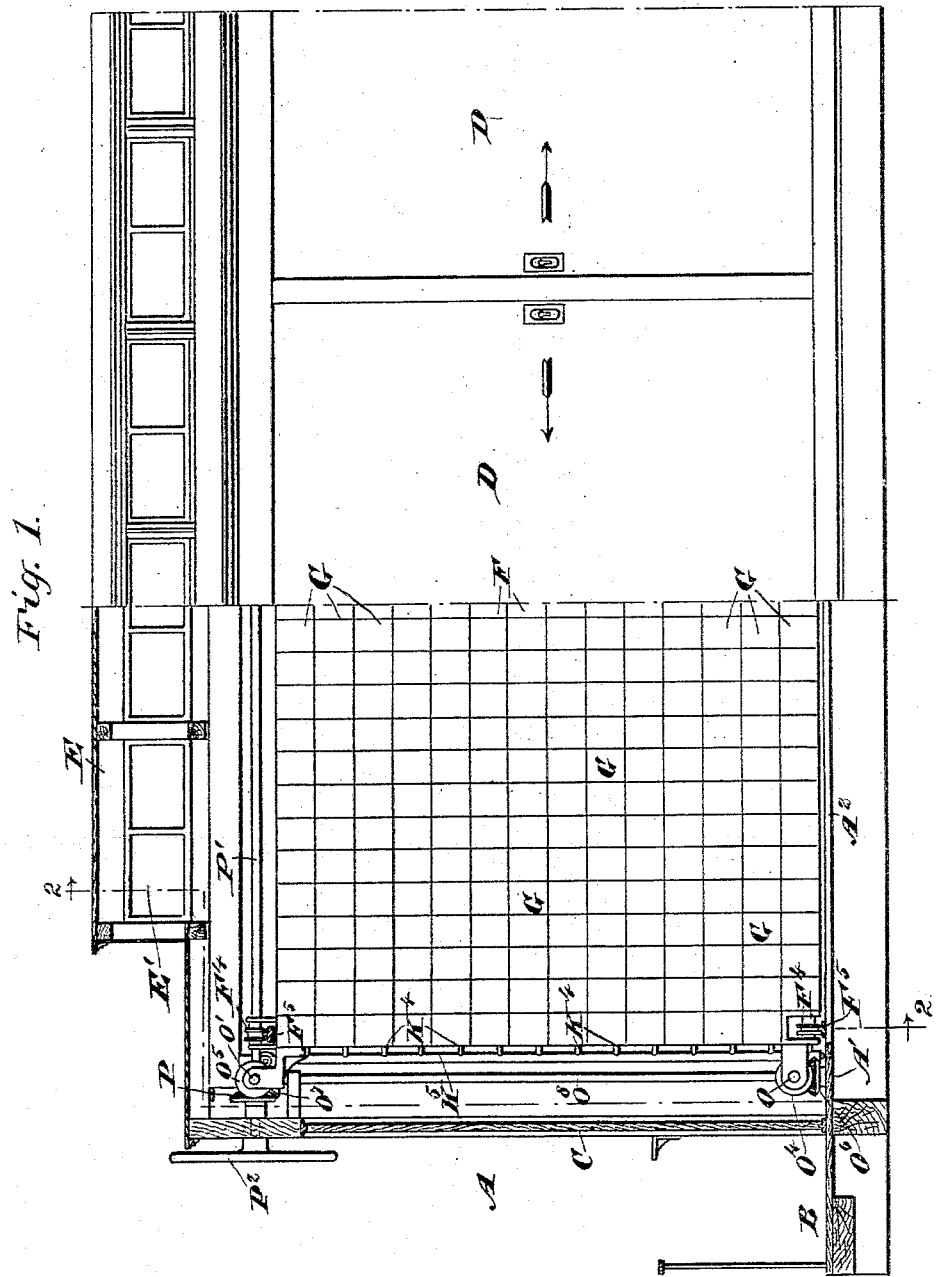
Figure 2:
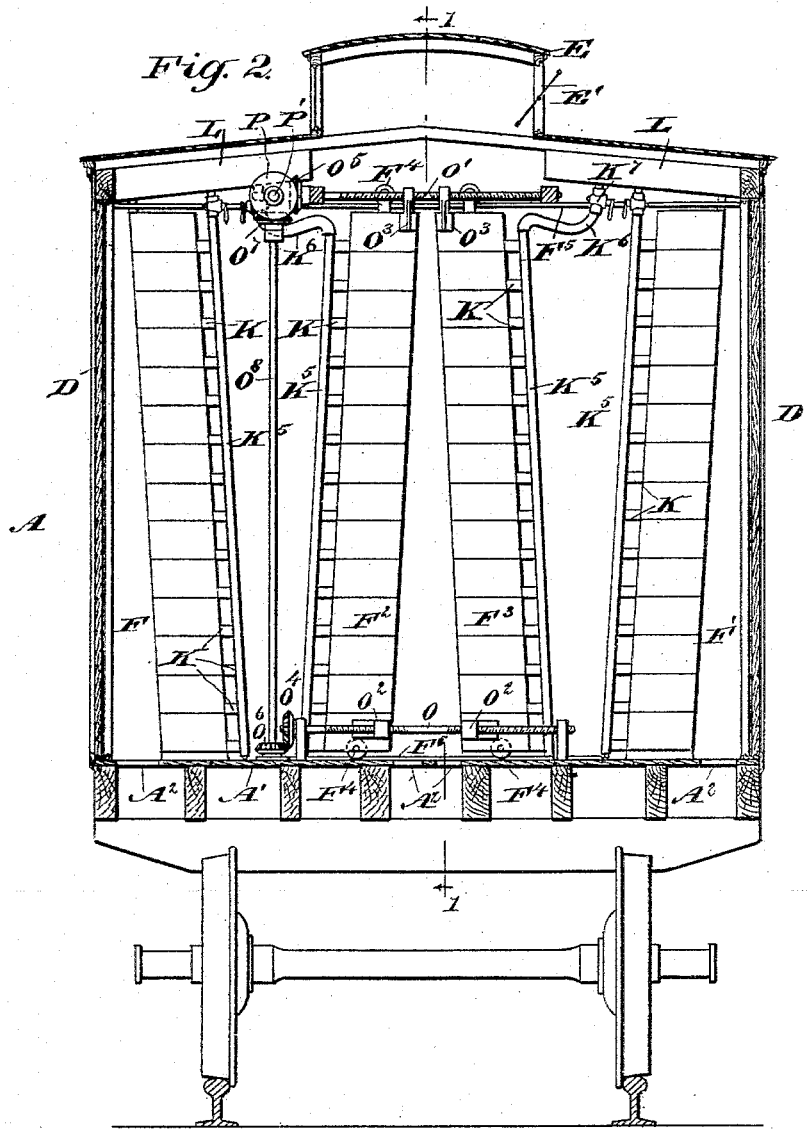
Figure 3:
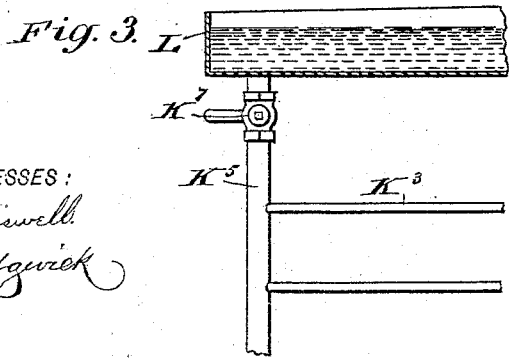
Figure 4:
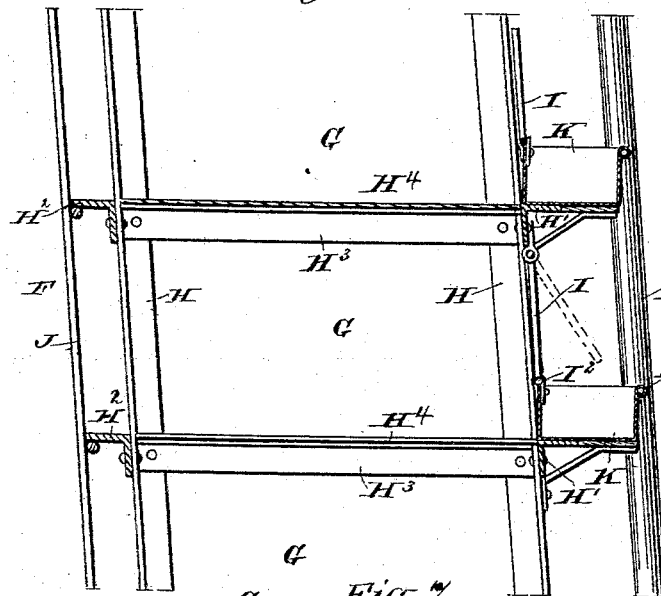
Figure 5:
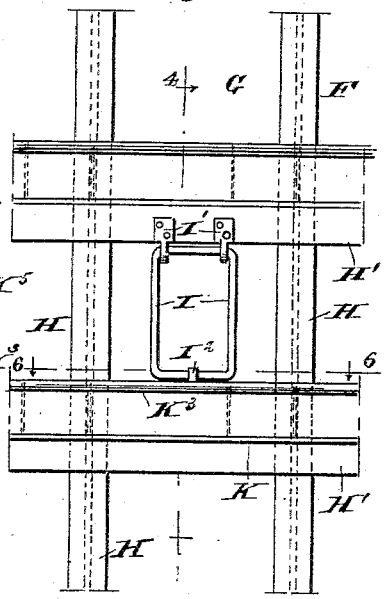
Figure 7:
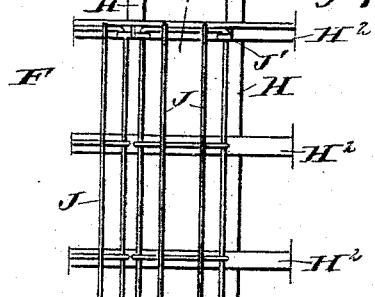
Figure 6:
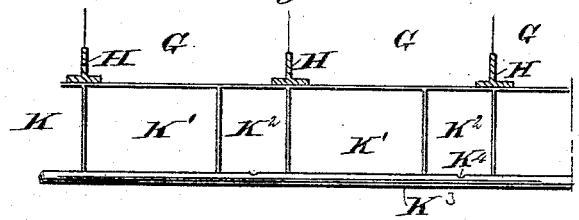
Figure 8:
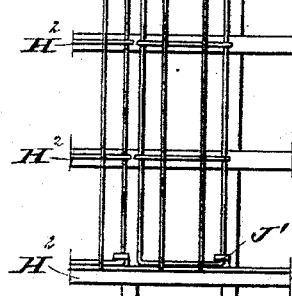

Figure 1 is a side elevation of the improvement with parts in section on the line 1—1 of Fig. 2. Fig. 2 is a transverse section of the same on the line 2—2 of Fig. 1. Fig. 3 is an enlarged side elevation of the water tank and outlet therefrom. Fig. 4 is an enlarged transverse section of part of the open frame-work on the line 4—4 of Fig. 5, and showing one complete compartment. Fig. 5 is a front view of the same. Fig. 6 is a plan view of the same on the line 6—6 of Fig. 5. Fig. 7 is a rear elevation of part of the frame-work showing the door for opening and closing several compartments in a vertical row, and Fig. 8 is a transverse section of part of the frame-work with a bird in position.

In shipping poultry as heretofore practiced a number of live birds were placed in a crate, and the latter stored in a car of the usual construction. In forwarding large shipments of poultry, a number of such filled crates were placed in the same car, usually one on top of the other. By this mode of shipping, the percentage of loss was considerable, owing mainly to the insufficiency of the sanitary arrangement, as the excrements or droppings remained in the crate and usually in the car, until the latter arrived at its destination. The excrements, besides their offensive odor which permeated the entire car, rapidly spread disease, and as a consequence the birds, if not actually dead at arrival, were at least in a very unhealthy condition and unfit for consumption. Furthermore, the totally insufficient feeding and watering arrangements for the poultry while in transit, as well as the continuous shaking up of the birds, and the rubbing of one on the other caused by the motion of the car, are the cause, on arrival, of the great reduction in weight, to the great disadvantage and loss of the shipper and dealer.

With my improved poultry car presently to be described, the above mentioned defects in shipping poultry are completely overcome, and the poultry on arrival at its point of destination, will be in a healthy condition and will have gained in weight.

The improved poultry car is provided with a body A, of suitable size and dimensions mounted on wheels in the usual manner, and preferably formed at its ends with platforms B and doors C, of any approved construction, to permit the attendant to pass in and out of the car and to facilitate loading and unloading, as hereinafter more fully described. The sides of the car body A are provided with suitable doors or rolling shutters to give access to the car from the sides for the purpose of loading and unloading, also as hereinafter more fully described.

The top of the car body A is formed with a ventilating dome E, preferably of the construction found in passenger cars, and provided at its sides with hinged or pivoted windows E', adapted to be opened and closed for the admission of light and for other purposes. Within this car body A is arranged a series of frame-works F, F', F² and F³ extending longitudinally in the car body and each placed in an inclined position as plainly shown in Fig. 2. Each frame-work is formed with compartments G, one for each single bird, the said compartments being arranged in vertical rows and the several compartments of one row being located one above and one in the rear of the other, as plainly shown in the drawings.

In order to place as many frame-works in one single car and still to have sufficient room for loading and unloading the frame-works with the poultry and to permit the attendant to conveniently feed the poultry, I prefer the arrangement shown in Fig. 2, that is, securing the frame-works F and F' permanently in position near the sides of the car while the two middle frame-works F² and F³ are mounted to slide transversely, being provided for this purpose with friction rollers or pulleys F⁴ mounted to travel on transversely-extending tracks F⁵ held in the car.

In the frame-works F and F', the outer sides, that is the ones adjacent to the sides of the car, form the rear, while in the other two frame-works F² and F³, the inner or adjacent sides form the rear, the said rear sides of all the frame-works being arranged above longitudinally-extending openings A² formed in the floor A' of the car body A. The longitudinal openings A² permit a ready discharge of the droppings of the birds held in the several compartments of the frame-works, it being readily understood that as the birds are located singly in the compartments, arranged as above described, the birds do not form obstructions one for the other, in regard to the droppings. Thus, without any assistance, the droppings are discharged immediately to the outside of the car so that no offensive odors whatever will remain within the car.

In order to construct each frame-work in a cheap and efficient manner, I prefer to employ light T-iron or light angle iron, as more fully illustrated in Figs. 4, 5, 6, 7 and 8. As illustrated in the said figures, each frame-work is provided with a series of front and rear posts H placed suitable distances apart and connected with each other at the front by longitudinal angle irons H' and at the rear by similar angle irons H², as will be readily understood by reference to the said figures. The front and rear posts H are also connected with each other by transverse angle irons H³ which support the flooring H⁴ on which the bird rests as plainly shown in Fig. 8.

It is understood that the several floors divide the compartments one from the other vertically, and the transverse angle irons H³ divide the compartments longitudinally. Each compartment G thus formed is of sufficient size to receive the largest bird, and each compartment is provided at its front with a door I preferably made in the shape of a link hinged at its upper end in bearings I' riveted or otherwise secured to the front angle iron H'. The lower end of the link I is provided with a suitable catch I² adapted to be attached to the feeding trough K supported in front of the compartment on the respective front angle iron H'. The rear ends of several compartments in a vertical row are closed by a single door J made of longitudinal and vertical iron bars as plainly shown in Fig. 7, the said door being hinged at J' at one side to one of the rear posts H and fastened at its free end by a suitable catch J³ to the next following rear post. The vertical middle bars of the door J are placed suitable distances apart to give sufficient room for the tail of the bird. See Figs. 7 and 8.

The front door I for each compartment is of sufficient size to permit the bird to pass its head and neck through the link to reach the food placed in the feeding trough K extending longitudinally in front of each horizontal row of compartments. As shown, the feeding trough K is preferably formed with two compartments K' and K² for each compartment G. The larger one K' is a feed box for receiving the solid food while the other one K² forms a water receptacle and is adapted to receive the water let into the said compartment by a horizontally-extending pipe K³ provided with an opening K⁴ discharging into the said compartment K². The pipe K³ preferably forms the front edge of the trough K, as plainly shown in Figs. 4, 5 and 6, and one end of the pipe at or near the end of the car, connects with a vertically-arranged pipe K⁵ connected at its upper end with a water tank L supported by suitable means in the roof of the car.

For the two movable frame-works F² and F³, the end pipes K⁵ are connected by a flexible hose K⁶ with the tank L, so as to permit of moving the said frame-works transversely without disconnecting their pipes K⁵ from the water tanks L. Valves K⁷ are preferably placed in the pipes K⁵ or in the flexible pipes K⁶ to fill the several water receptacles whenever necessary or to shut off the water after the said receptacles have been filled. The feed troughs K are preferably made of a light sheet metal.

In order to move the middle frame-works F² and F³ transversely, the following device is provided: On the frame-works near their ends and on the bottom and top are arranged right and left handed threaded screw rods O and O' engaging nuts O² and O³ respectively, on the frame-works, as plainly shown in Fig. 2. The screw rods O, O' carry at one outer end the bevel gear wheels O⁴ and O⁵ respectively in mesh with the bevel gear wheels O⁶ and O⁷ respectively, mounted on a vertically-arranged shaft O⁸ revolving in suitable bearings at the ends of the car. The upper bevel gear wheel O⁷ also meshes into a bevel gear wheel P secured on a longitudinally-extending shaft P' mounted to turn in suitable bearings in the car body and carrying at one outer end a hand wheel P² for conveniently turning the said shaft P'. It is understood that this shaft P' is connected at each end with the respective vertical shaft O⁸ so that when the shaft P' is turned, a simultaneous turning motion is imparted to the several screw rods O' and O, at both ends of the car, thereby moving the frame-works toward and from each other, according to the direction in which the hand wheel P² is turned.

When it is desired to fill the empty frame-works F² and F³ with poultry, the said frame-works are moved outwardly from each other by turning the hand wheel P² in the proper direction. By doing this, the frame-works F² and F³ are moved outward until their lower ends are close to the lower ends of the fixed frame-works F and F'. The space between the two frame-works F² and F³, is now sufficient to form a convenient passage for the attendants to fill the individual compartments of the said frameworks with live birds. The attendants pass into the space between the frame-works F² and F³ from the ends of the car through the door C, and in filling the compartments, the doors J are opened and a number of birds put in the open compartments of one door, after which the door is again closed and the next series of compartments covered by one door J are filled in the same manner. It is understood that the birds are introduced from the rear sides of each frame-work as before explained, so that the heads of the birds pass out through the doors I, as plainly shown in Fig. 8. After the frame-works F² and F³ are filled with birds, the motion of the hand wheel P² is reversed, so that the filled frame-works move toward each other, back to their former position, as shown in Fig. 2, so that the rear sides are directly above the openings A² through which can freely pass the droppings of the birds.

In loading the fixed frame-works F and F', the side doors D of the car are open, and the compartments covered by one door J are filled, the door is closed, and the next set of compartments covered by another door D are loaded in a like manner until all the compartments in the frame-works F and F' are filled. The side doors D are arranged in such a manner that the attendants can move one door past the other, so as to load the car in sections until the entire car is loaded in the manner described.

It will be seen that sufficient space is formed between the frame-works F and F' and the frame-works F² and F³, so that the operator or attendant can conveniently step between the said frame-works F and F² and F' and F³ to place the necessary food into the compartments K' of the feed trough K. The water for the receptacles K² of the feed trough, is furnished through the pipes K³ and K⁵, the valves K⁷ being manipulated in the manner before described.

Now, it will be seen that each bird has its own compartment, and is consequently not thrown against the other birds in the car, during transit.

It will further be seen that the poultry can be conveniently fed with substantial food and supplied with the necessary water so that the poultry can readily gain in weight, instead of losing it, as is the case when the poultry is shipped in crates, as before mentioned.

It will further be seen that a very large quantity of poultry can be conveniently shipped in a single car so that the cost of transportation is materially reduced.

Having thus fully described my invention, I claim as new and desire to secure by Letters Patent—

1. A poultry carrier comprising a plurality of compartments arranged in inclined tiers, each one of a size to confine a single fowl so as to prevent turning and with rear exposed, whereby the droppings fall clear of the compartments beneath and of the fowls in the said compartments, substantially as shown and described.

2. A poultry carrier comprising a portable receptacle containing inclined tiers of compartments each of a size to confine a fowl as described, the respective tiers being arranged in two or more horizontal series set apart to form passages between them, substantially as shown and described.

3. A poultry shipper comprising a wheeled car provided with a series of single compartments for individual fowls said compartments being arranged one above the other and inclined on the rear side whereby each compartment will at such side overhang the compartments below it, means being provided at the front and rear sides of such compartments for retaining the fowls and the car floor being provided with an opening which is arranged vertically below or under the rear ends of the several compartments of the upright series whereby excrement dropped therefrom will pass entirely out of the car all substantially as and for the purposes set forth.

4. A poultry shipper comprising a wheeled car body, and an open inclined framework of the car body and having slanting rows of single compartments located one above and in the rear of the other, separate doors controlling individually the front of each compartment and doors covering the rear of the said compartments, substantially as shown and described.

5. A poultry car provided with an open inclined frame-work forming a permanent fixture of the car, and having slanting rows of single compartments located one above and in the rear of the other, feed troughs arranged on the front side of the said compartments, each of the troughs being divided into a feed box and a water receptacle for each compartment, substantially as shown and described.

6. A poultry car provided with an open inclined frame-work forming a permanent fixture of the car, and having slanting rows of single compartments located one above and in the rear of the other, feed troughs arranged on the front side of the said compartments, each of the troughs being divided into a feed box and a water receptacle for each compartment, and a water pipe for filling each water receptacle of the trough, substantially as shown and described.

7. A poultry car provided with an open inclined frame-work forming a permanent fixture of the car, and having slanting rows of single compartments located one above and in the rear of the other, feed troughs arranged on the front side of the said compartments, each of the troughs being divided into a feed box and a water receptacle for each compartment, a water pipe for filling each water receptacle of the trough, and water tank for filling the several water pipes of the troughs, substantially as shown and described.

8. A poultry car comprising a body, a series of fixed frame works held in the said car body, and a series of movable frame works arranged in the said body and mounted to slide toward and from the said fixed frame works to form passageways between the several frame works for loading and feeding the poultry, the said series of fixed and movable frame works being provided with single compartments, one for each bird, substantially as shown and described.

9. A poultry car comprising a body, a series of fixed frame works held in the said car body, and a series of movable frame works arranged in the said body and mounted to slide toward and from the said fixed frame works to form passageways between the several frame works for loading and feeding the poultry, the said series of fixed and movable frame works being provided with single compartments, one for each bird, and means, substantially as described, for imparting a sliding motion to the said movable frame works to form the said passageways, substantially as shown and described.

10. A poultry car comprising a body, a series of fixed frame works held in the said car body, and a series of movable frame works arranged in the said body and mounted to slide toward and from the said fixed frame works to form passageways between the several frame works for loading and feeding the poultry, the said series of fixed and movable frameworks being adapted to receive and support the fowl; substantially as shown and described.

11. A poultry car comprising a body, a series of fixed frame works held in the said car body, and a series of movable frame works arranged in the said body and mounted to slide toward and from the said fixed frame works to form passageways between the several frame works for loading and feeding the poultry, the said series of fixed and movable frameworks being adapted to receive and support the fowl; and means for imparting a sliding motion to the said movable frame works to form the said passage ways, substantially as shown and described.

12. A poultry car comprising a body, a series of fixed frame-works held in the said car body, a series of movable frame-works arranged in the said body and located between the fixed frame-works, the said frame-works being inclined and each formed with rows of vertical compartments, the rear sides of which are located over openings in the car floor, substantially as shown and described.

JOSEPH BABBITT MOCKRIDGE.

Witnesses:
THEO. G. HOSTER,
EDGAR TATE.